United States Patent
McDonough et al.

[15] 3,697,616
[45] Oct. 10, 1972

[54] SELECTIVE ISOMERIZATION OF 1-OLEFINS TO 2-OLEFINS

[72] Inventors: John M. McDonough, 8004 South Menard, Oak Lawn, Ill. 60459; Linsley S. Gray, Jr., 3948 Forest Avenue, Downers Grove, Ill. 60515

[22] Filed: March 1, 1971

[21] Appl. No.: 119,917

[52] U.S. Cl.............................260/683.2, 252/455
[51] Int. Cl.................................C07c 5/24
[58] Field of Search..........................260/683.2

[56] References Cited

UNITED STATES PATENTS

| | | | |
|---|---|---|---|
| 2,988,578 | 6/1961 | Fleck et al. | 260/683.2 |
| 3,013,986 | 12/1961 | Castor | 252/455 |
| 3,150,202 | 9/1964 | Holt et al. | 260/683.2 |
| 3,236,909 | 2/1966 | Winnick | 260/683.2 |

*Primary Examiner*—Delbert E. Gantz
*Assistant Examiner*—C. E. Spresser
*Attorney*—Francis W. Young, Walter H. Steinbauer, Jr. and Alexander & Speckman

[57] ABSTRACT

A process for the selective isomerization of 1-olefins to 2-olefins comprising the contacting of a 1-olefin with a sodium coated, calcium metal aluminosilicate molecular sieve catalyst at temperatures of about the freezing point of the 1-olefin being isomerized to about 150° C.

12 Claims, No Drawings

SELECTIVE ISOMERIZATION OF 1-OLEFINS TO 2-OLEFINS

BACKGROUND OF THE INVENTION

This invention relates to a process for the selective isomerization of olefinic hydrocarbons. More particularly, the invention is concerned with a process for selectively isomerizing 1-olefins to 2-olefins through the utilization of a catalytic composition.

Beta or 2-olefins are neither abundantly available in natural quantities nor significantly produces as by-products of existing chemical processes. Further, processes directed to actual production of such products are difficult to carry out on a large-scale basis and require the use of prohibitively expensive and often hazardous reagents. In attempts to avoid the many disadvantages connected with the direct production of 2-olefins, processes have been designed to achieve such products from the isomerization of 1-olefins. Unfortunately, such processes have previously resulted in undesirable skeletal isomerization, dehydrogenation, disproportionation, polymerization and/or short life isomerizing catalyst activity.

It is a primary object of this invention to provide a process for producing 2-olefins.

It is a more particular object of this invention to produce 2-olefins from 1-olefins by a selective isomerization process.

It is another object of this invention to provide the isomerization of long hydrocarbon chain 1-olefins to 2-olefins at conversion levels of at least 70 percent.

It is yet another object of this invention to provide high conversion of 1-olefins to 2-olefins without substantial skeletal isomerization, dehydrogenation, disproportionation and/or polymerization.

Additionally, it is an object of the present invention to accomplish selective 1-olefin to 2-olefin isomerization through the utilization of a catalytic system which provides relatively long catalyst life.

Other objects and advantages of the invention will become apparent upon reading the following description and specific examples.

In accordance with the present invention a 1-olefin is effectively isomerized to a 2-olefin by contacting the 1-olefin with a calcium metal aluminosilicate molecular sieve which is coated with a monoatomic layer of sodium metal. This process is extremely desirable in terms of specificity and speed, since relatively high conversions of 1-olefinic hydrocarbons to 2-olefinic hydrocarbons of 70 percent or better are achieved at room temperature in relatively short periods of time. Also, side effects such as other skeletal isomerization, dehydrogenation, disproportionation and/or polymerization typically characteristic of other isomerization processes are minimized by the process of this invention. Furthermore, the catalytic system employed has been found to have a relatively long, useful life.

The selective isomerization process of this invention involves only the three terminal carbon atoms of the 1-olefins. Suitable olefins for use in this invention are structurally represented as follows:

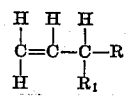

wherein the total number of carbon atoms is from about six to about 25, and preferably about six to about 18; $R_1$ is selected from the group consisting of straight chain alkyls containing one to three carbon atoms and hydrogen, although preferably $R_1$ is hydrogen; and R is a substituent which does not react with sodium, and may include straight or branched chain alkyls containing three to 22 carbon atoms and preferably about three to 15 carbon atoms. The R group may contain functional radicals which do not react with sodium.

Typical 1-olefinic materials which may be used include 1-hexene, 1-heptene, 1-octene, 1-nonene, 1-decene, 1-hendecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 3-methyl-1-pentene, 4-methyl-1-pentene, 3-methyl-1-hexene, 4-methyl-1-hexene, 5-methyl-1-hexene, 3-methyl-1-heptene, 4-methyl-1-heptene, 6-methyl-1-heptene, 3-methyl-1-octene, 4-methyl-1-octene, 5-methyl-1-octene, 7-methyl-1-octene, 3-ethyl-1-pentene, 3-propyl-1-hexene, 4-ethyl-1-hexene, 3-ethyl-1-heptene, 4-ethyl-1-heptene, 5-ethyl-1-heptene, 4-propyl-1-octene, 5-propyl-1-octene, 6-ethyl-1-octene, 6-propyl-1-nonene, 7-propyl-1-decene, 8-ethyl-1-hendecene, 5-ethyl-1-dodecene, 6-propyl-1-tridecene, 11-ethyl-1-tetradecene, 12-propyl-1-pentadecene, 9-ethyl-1-hexadecene, 10-propyl-1-eicosene, 7-ethyl-1-heneicosene, 19-propyl-1-docosene and 16-ethyl-1-tricosene. Mixtures of olefinic hydrocarbons are suitable as feed stocks for the process of the present invention.

The catalytic material of the present invention is important to the excellent results achieved. A calcium metal aluminosilicate molecular sieve coated with a monoatomic layer of sodium metal must be employed to achieve the objects of this invention. The basic calcium metal aluminosilicate molecular sieve is commercially available (Union Carbide Corporation, Linde Division) and is typically produced by 75 percent ion exchange of calcium ions for sodium ions of the sodium metal aluminosilicate sieves which may be represented by the general formula:

The calcium metal aluminosilicates have internal surface areas of greater than 500 and typically about 650 to 800 square meters per gram and external areas of about 1 to 3 square meters per gram. The average volume of their voids is about 0.38 cubic centimeters per gram. Such sieves may be obtained in either pellet or powdered form.

In order to transform the calcium metal aluminosilicate sieve to the catalyst utilized in the process of this invention, it is necessary to coat its surface, by adsorption thereon, with a monoatomic layer of sodium metal. Disposition of the monoatomic sodium metal layer may be performed in any suitable manner. An extremely convenient method involves intimately contacting an activated calcium metal aluminosilicate sieve with a vapor of sodium metal in an inert atmosphere as taught by U.S. Pat. No. 3,013,986, the disclosures of which are incorporated herein by reference.

The catalyst of this invention may be first prepared by activating a calcium metal aluminosilicate molecular sieve by subjecting it to temperatures of about 350° C while it is in a flowing stream of inert dry gas or in a vacuum in order to drive off substantially all of the water contained therein. The resulting molecular sieve is then ready to be coated with the sodium metal by mixing molten sodium metal and the molecular sieve; by vaporizing the sodium metal in the presence of the molecular sieve; or by entraining the sodium metal vapors in an inert gas and passing the metal vapor-containing gas stream through a bed of the molecular sieve. In any case, a monoatomic layer of the sodium metal is adsorbed by the molecular sieve.

In each of the above alternative procedures, the quantity of sodium metal which is necessary to coat the calcium metal aluminosilicate sieve as a monoatomic layer will vary with the surface area of the sieve. Therefore, exact weight percents of sodium necessary to coat the sieve as a monoatomic layer cannot be given generally. Instead, the quantity of sodium metal necessary to coat a given calcium metal aluminosilicate sieve must be determined, individually, for each case. Normally about 12 to about 16 percent by weight of sodium metal, based on the weight of the calcium metal aluminosilicate sieve, is required for coating when a powdered sieve is used. If the sieve is not adequately coated with an essentially monoatomic layer of sodium metal a loss of catalytic activity causing a corresponding decrease in the specificity of conversion of 1-olefins to 2-olefins will result. Also, if excessive amounts of sodium metal are used for coating, desired catalytic activity will again decrease.

The resulting sodium coated, calcium metal aluminosilicate catalyst is uniquely selective in isomerizing 1-olefinic hydrocarbons to 2-olefinic hydrocarbons as a result of its unusual property of initially favoring formation of 2-olefins. However, this preference is time-limited and will give way to formation of other internal olefins such as 3-olefin, 4-olefin, etc., after a given period of time. Suitable residence times are dependent on the type of 1-olefin being isomerized and the reaction temperature. Therefore, care must be taken to isomerize 1-olefins only within that time interval during which other internal olefin production is kept to a minimum. Such minimum production is less than about 10 percent as based on total double bond distribution and preferably less than about 5 percent.

Utilizing the process of this invention, 1-olefinic to 2-olefinic conversions in excess of 70 percent can be achieved in relatively short periods of time, such as 10–15 minutes at ambient temperature of about 25° to about 35° C, and atmospheric pressure. Typically, such conversions, as in the case of 1-hexadecene to 2-hexadecene, approach 90 percent. While room temperatures can normally be utilized, reaction temperatures may vary from about the freezing point of the 1-olefin being isomerized to about 150° C. The reaction temperature at which isomerization takes place will also vary with the residence time at which the isomerization reaction is to be conducted.

The reaction temperature can be lowered if a hydrocarbon solvent or solvents is included within the contacting system environment provided the 1-olefin being isomerized is soluble in the hydrocarbon solvent and the sodium coating does not react with the solvent. When the hydrocarbon solvents are included within the contacting system environment, the reaction temperature may be lowered to about the freezing point of the solvent for the isomerization of 1-olefins which remain soluble in the hydrocarbon solvent at such temperatures. Such hydrocarbon solvents preferably have freezing points of about down to −80° C. Suitable hydrocarbon solvents which may be used are pentane, hexane and heptane. Consequently, the reaction temperatures in such a system may be about −80° C to about 150° C. For purposes of process convenience, however, with or without use of hydrocarbon solvents, preferred reaction temperatures are from about 20° C to about 40° C.

The residence time during which a 2-olefin is produced from the isomerization of a specific 1-olefin while maintaining production of other internal isomers to conversion levels of less than about 10 percent, can be readily determined. This is done by continuously taking representative samples at noted time intervals during the isomerization reaction and analyzing the collected samples to determine double bond distribution by such methods as gas chromatography, or nuclear magnetic resonance spectroscopy. By noting the analyses the residence time required to achieve the conversion levels set forth above, i.e., less than 10 percent conversion of 1-olefin to internal olefins other than 2-olefin, can be determined. Explicit residence times cannot be given since such will vary with the isomerization reaction system being employed. After the isomerization reaction has been conducted for the desired residence time, it is terminated by quenching by the addition of a material such as petroleum ether to the reaction system and separating the liquid and solid phases. The produced olefins are then collected and separated into their 1 and 2 isomers by such techniques as fractional distillation. After this separation, the 1-olefin may be recycled for continued use in the selective isomerization process of this invention and the 2-olefin is collected as a final product.

The olefinic hydrocarbon is contacted with the sodium coated calcium metal aluminosilicate sieve catalyst in either a batch or continuous system. When a batch system is employed as the processing mode the 1-olefinic hydrocarbon is intimately mixed with the sodium coated calcium aluminosilicate sieve in a fixed volume such as a reaction vessel. When performed via a continuous processing system, the 1-olefinic hydrocarbon is passed through a column containing a sodium coated calcium aluminosilicate catalyst bed. However, regardless of the reaction system used, care must be exercised that substances which are reactive with sodium metal are not included as part of the system environment subsequent to the disposition of the sodium metal onto the calcium metal aluminosilicate sieve.

The following Examples are given to illustrate preferred embodiments of this invention.

EXAMPLE I

Preparation of Sodium Coated Calcium Metal Aluminosilicate Sieve Catalyst 40 grams of a free-flowing powder of calcium metal aluminosilicate sieve (available from Union Carbide Corp. Linde Division as 10X Molecular Sieve) were placed in a three-neck round-bottom flask equipped with a mechanical stirrer, nitrogen inlet and outlet and a temperature sensing port. The free-flowing sieve powder was blanketed with a dry nitrogen flow and heated with stirring to 200° C. 6 grams of sodium metal were added in ¼gm chunks. Upon melting, the sodium metal formed a uniform coating over the sieve powder forming a dark gray to black powder as a result of vigorous continued stirring. The resulting product was a sodium monoatomic coated calcium metal aluminosilicate sieve. This catalyst was allowed to cool, stirring being discontinued when temperature below the melting point of the sodium metal was achieved.

EXAMPLE II

Isomerization of 1-Hexadecene 42.5 grams of a calcium metal aluminosilicate sieve (available from Union Carbide Corp., Linde Division as 10X molecular sieve), coated with 6.5 grams of sodium in accordance with the procedure given in Example I, were produced in a flask and the flask then maintained at a temperature of 25° C. Subsequently, 101 grams of 1-hexadecene were added to the flask. The contents were mixed continuously. A sample, withdrawn after 10 minutes, was analyzed via gas chromotagraphy. The analysis showed that the 1-hexadecene was isomerized to 88 percent 2-hexadecene and 8 percent 3-hexadecene. Four percent remained as 1-hexadecene.

EXAMPLE III

Isomerization of 4-methyl-1-hexene 43.0 grams of a calcium metal aluminosilicate sieve (available from Union Carbide Corp., Linde Division as 10X molecular sieve) coated with 6.1 grams of sodium in accordance with the procedure given in Example I, were produced in a flask and the flask then maintained at a temperature of 25° C. Subsequently, 12.3 grams of 4-methyl-1-hexene were added to the flask along with 81.8 grams of 1-hexadecene solvent. The contents were mixed continuously. A sample withdrawn after 15 minutes, was analyzed by nuclear magnetic resonance after separation of the 4-methyl-hexenes from the hexadecene by distillation. The analysis showed that the 4-methyl-1-hexene was isomerized to 70 percent 4-methyl-2-hexene and only trace amounts of 4-methyl-3-hexene.

The following are given as illustrative experiments, the results of which illustrate, by comparison, the unexpected results of the present invention in selectively isomerizing 1-olefins to 2-olefins.

ILLUSTRATIVE EXPERIMENT I

Attempted Isomerization of 1-Hexadecene With A Non-Sodium Coated Calcium Metal Aluminosilicate Sieve 42.5 grams of a calcium metal aluminosilicate sieve (available from Union Carbide Corp., Linde Division as 10X molecular sieve) were added to a flask maintained at a temperature of 23° C. Subsequently, 101.4 grams of 1-hexadecene were added to the flask. The contents were mixed continuously. A sample withdrawn after 50 minutes, was analyzed via gas chromatography. The analysis showed the sample to be 100 percent 1-hexadecene.

ILLUSTRATIVE EXPERIMENT II

Attempted Isomerization of 1-Hexadecene With A Sodium Coated Sodium Metal Aluminosilicate Sieve 37.5 grams of a sodium metal aluminosilicate sieve (available from Union Carbide Corp., Linde Division as 13X molecular sieve), coated with 5.1 grams of sodium in accordance with the procedure given in Example I, were added to a flask maintained at a temperature of 25° C. Subsequently, 95.0 grams of 1-hexadecene were added to the flask. The contents were mixed continuously. Samples withdrawn after 30 and 90 minutes were analyzed and found to contain no 2-hexadecene.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for selectively isomerizing a 1-olefin to a 2-olefin without substantial skeletal isomerization, dehydrogenation, disproportionation and polymerization comprising contacting said 1-olefin at a temperature of about the freezing point of the 1-olefin being isomerized to about 150° C with a calcium metal aluminosilicate sieve coated with a monoatomic layer of sodium metal for a time sufficient to effect conversion of the 1-olefin to the 2-olefin.

2. The process of claim 1 wherein the olefinic hydrocarbon is represented by the following formula:

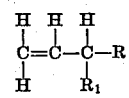

wherein the total number of carbon atoms is about six to about 25; $R_1$ is selected from the group consisting of straight chain alkyls containing one to three carbon atoms and hydrogen; and R is any substituent which does not react with sodium.

3. The process of claim 2 wherein the reaction temperature is about 20° C to about 40° C.

4. The process of claim 2 wherein the reaction temperature is 25°–35+ C and the reaction is maintained at that temperature for a residence time of 10 – 15 minutes whereby the 1-olefin is isomerized to 2-olefin at conversion levels of at least about 70 percent.

5. The process of claim 4 wherein the number of carbon atoms is about six to about 18.

6. The process of claim 4 wherein the 1-olefinic hydrocarbon is selected from the group consisting of 1-hexadecene and 4-methyl-1-hexene.

7. The process of claim 2 wherein the calcium metal aluminosilicate sieve is in powdered form and is coated with about 12 to about 16 percent by weight of sodium metal as based on the weight of the calcium metal aluminosilicate sieve.

8. The process of claim 2 wherein $R_1$ is hydrogen.

9. The process of claim 2 wherein R is selected from the group consisting of straight chain and branched chain alkyls containing three to 22 carbon atoms.

10. The process of claim 2 wherein said contacting of the 1-olefin and the calcium metal aluminosilicate sieve coated with a monoatomic layer of sodium metal is conducted in the presence of a hydrocarbon solvent, said solvent being non-reactive with sodium and in which the 1-olefin is soluble.

11. The process of claim 10 wherein the hydrocarbon solvent has a freezing point of about down to −80° C.

12. The process of claim 11 wherein the 1-olefin, the hydrocarbon solvent and the calcium aluminosilicate sieve are contacted at a temperature of about −80° C to about 150° C.

* * * * *